United States Patent
Rosnow et al.

(10) Patent No.: US 10,089,159 B2
(45) Date of Patent: Oct. 2, 2018

(54) PROCESSING NON-SPATIAL INPUT BY MULTIPLE PROGRAM ELEMENTS OF A COMPUTER PROGRAM EXECUTED ON A COMPUTER

(71) Applicant: Microsoft Technology Licensing, LLC, Redmond, WA (US)

(72) Inventors: Harley M. Rosnow, Kirkland, WA (US); Xin Gong, Sammamish, WA (US); Scott R. Honji, Sammamish, WA (US); Elliot H. Omiya, Kirkland, WA (US); Stephen H. Wright, Bothell, WA (US); Albert Hwang, Brooklyn, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/373,400

(22) Filed: Dec. 8, 2016

(65) Prior Publication Data
US 2018/0121265 A1 May 3, 2018

Related U.S. Application Data (60) Provisional application No. 62/417,259, filed on Nov. 3, 2016.

(51) Int. Cl.
*G06F 9/54* (2006.01)
*G06F 9/44* (2018.01)
*G06F 9/448* (2018.01)

(52) U.S. Cl.
CPC ............ *G06F 9/542* (2013.01); *G06F 9/4436* (2013.01); *G06F 9/4494* (2018.02)

(58) Field of Classification Search
CPC .................................. G06F 9/54; G06F 9/542
See application file for complete search history.

(56) References Cited

U.S. PATENT DOCUMENTS 5,916,310 A    6/1999   McCain
5,991,794 A * 11/1999   Hodges ................. G06F 9/4443
                                                                                                                                          718/104

(Continued)

OTHER PUBLICATIONS

"How to Use the Focus Subsystem", Retrieved on: Aug. 31, 2016 Available at: https://docs.oracle.com/javase/tutorial/uiswing/misc/focus.html.

(Continued)

*Primary Examiner* — Umut Onat
(74) *Attorney, Agent, or Firm* — Patent GC LLC (57) ABSTRACT

A computer system supports a protocol to process directional navigation inputs to a host application and its component, to manage which component is currently active to receive input events. A first component determines whether to transfer focus to a second component. The first component initiates the transfer by sending a request to the second component. Further input events are queued. The second component processes the request to determine how to transfer focus within the second component. The second component indicates to the operating system how focus has been transferred. The operating system updates information to reflect the changes in state of the components, and informs the host and component that the state has been updated. Queued input events then can be released for processing according to the changed focus. Where the components are separate, independent processes, the protocol can be implemented through inter-process communication techniques.

20 Claims, 5 Drawing Sheets

(56) References Cited

U.S. PATENT DOCUMENTS

| | | | |
|---|---|---|---|
| 6,249,284 | B1 | 6/2001 | Bogdan |
| 6,606,106 | B1 | 8/2003 | Mendenhall et al. |
| 6,614,457 | B1 | 9/2003 | Sanada et al. |
| 7,073,136 | B2 | 7/2006 | Gajewska et al. |
| 7,111,243 | B1 | 9/2006 | Ballard et al. |
| 7,219,331 | B2 | 5/2007 | Pabla |
| 7,346,859 | B2 | 3/2008 | Keohane et al. |
| 7,356,775 | B2 | 4/2008 | Ruelle et al. |
| 7,631,272 | B2 | 12/2009 | Bogdan et al. |
| 7,631,278 | B2 | 12/2009 | Miksovsky et al. |
| 7,712,051 | B2 | 5/2010 | Chadzelek et al. |
| 7,770,121 | B2 | 8/2010 | Jain et al. |
| 7,870,512 | B2 | 1/2011 | Misovski |
| 8,510,753 | B2 | 8/2013 | Michail et al. |
| 8,552,984 | B2 | 10/2013 | Knaven |
| 8,751,626 | B2 | 6/2014 | Pinkston et al. |
| 8,812,975 | B2 | 8/2014 | Sandman, Jr. et al. |
| 8,863,010 | B2 | 10/2014 | Misovski |
| 9,003,326 | B2 | 4/2015 | Swingler et al. |
| 9,128,803 | B2 | 9/2015 | Shukla et al. |
| 2003/0005174 | A1* | 1/2003 | Coffman ............... G06F 9/4443 719/318 |
| 2003/0056024 | A1* | 3/2003 | Tlaskal ................. G06F 9/542 719/315 |
| 2004/0141012 | A1 | 7/2004 | Tootill |
| 2006/0064649 | A1 | 3/2006 | Weber et al. |
| 2006/0112349 | A1 | 5/2006 | Clow et al. |
| 2006/0117267 | A1 | 6/2006 | Koralski et al. |
| 2008/0034304 | A1 | 2/2008 | Feuerbacher et al. |
| 2008/0109753 | A1* | 5/2008 | Karstens ............... G06F 9/4443 715/802 |
| 2010/0023888 | A1 | 1/2010 | Song |
| 2010/0146379 | A1 | 6/2010 | George et al. |
| 2012/0331411 | A1 | 12/2012 | Dempsey |
| 2013/0110661 | A1 | 5/2013 | George et al. |
| 2013/0139072 | A1 | 5/2013 | Kaza et al. |
| 2014/0245205 | A1 | 8/2014 | Smith |
| 2016/0019030 | A1 | 1/2016 | Shukla et al. |
| 2016/0139737 | A1 | 5/2016 | Conn et al. |

OTHER PUBLICATIONS

"Keyboard Focus", Published on: Oct. 24, 2015 Available at: https://doc.qt.io/archives/qtjambi-4.5.2_01/com/trolltech/qt/focus.html.

"About Caph Focus Management (Focus Navigation)", Retrieved on: Aug. 31, 2016 Available at: https://www.samsungdforum.com/TizenGuide/tizen2881/index.html.

* cited by examiner

PROCESSING NON-SPATIAL INPUT BY MULTIPLE PROGRAM ELEMENTS OF A COMPUTER PROGRAM EXECUTED ON A COMPUTER

CROSS-REFERENCE TO RELATED APPLICATIONS

This application is a non-provisional application claiming priority to, and the benefits of, U.S. provisional patent application 62/417,259, filed Nov. 3, 2016, entitled "PROCESSING NON-SPATIAL INPUT BY MULTIPLE PROGRAM ELEMENTS OF A COMPUTER PROGRAM EXECUTED ON A COMPUTER", which is hereby incorporated by reference.

BACKGROUND

It is becoming more common for developers of computer programs to create a single combined application from multiple, separate computer programs. In general, a main computer program, called a host computer program, refers to and uses one or more other computer programs. These other computer programs, in some implementations, may include yet other computer programs. In some cases, an application can be built using components that are separate applications that are combined together when executed into what appears to be a single, combined application.

A computer program typically provides, when executed on a computer, a graphical user interface through which a user can interact with the computer while the computer is executing the computer program. When an application is built using components that are separate applications, the graphical user interface for the combined application is a combination of the graphical user interfaces generated by a host component and by the other components which are used and referenced by the host component. This combination can be performed by an operating system service at the direction of the host component.

There also has been a trend in developing operating systems that require computer programs to execute more securely. In particular, an operating system can require applications to be one or more components, where each component executes as an application, with one or more processes, but which is separate and independent from other applications, and thus other components. Such segregation of the execution of components into separate applications can be provided for several reasons, such as to reduce the ability of a first component to affect operation of a second component.

There are several technical problems to solve in an operating system that executes components of a combined application as separate applications. Some of the technical problems to be solved relate to providing an intuitive user experience. One part of providing an intuitive experience is providing proper handling of non-spatial input events from input devices, e.g., by directing the input events to the right component of the combined application at the right time.

SUMMARY

This Summary is provided to introduce a selection of concepts in a simplified form that are further described below in the Detailed Description. This Summary is intended neither to identify key or essential features, nor to limit the scope, of the claimed subject matter.

When an application has multiple program elements which are executing on a computer, the program elements together implement a protocol to manage which program element is currently active, to which non-spatial input events are directed by the operating system. An active program element also can have a control of the graphical user interface which currently has "focus". Generally, the operating system directs any non-spatial input events to the active program element. Depending on a type of a non-spatial input event, the active program element may direct such input events to a control having focus. In response to receiving a non-spatial input event, a first program element which currently is active, determines whether to process the input event or whether another program element should process the input event. For example, a program element can decide whether to process the input event with a control that currently has focus, or to change focus to another control of the graphical user interface of that program element, or whether focus should be transferred to a control managed by another program element.

As used herein, a program element can be an application, process, thread or user interface framework. Thus, as an example, given first and second program elements, the first and second program elements can be separate applications, managed independently of each other by the operating system. The first and second program elements can be separate processes of an application. The first and second program elements can be separate threads of a process. The first and second program elements can be separate user interface frameworks on a thread of a process.

When the application being executed is a combined application, including a host component and other components executed as separate applications, the components together can implement such a protocol. Thus, the components cooperate to manage which component is a currently active application to receive non-spatial input events from the operating system. An active component also can have a control, in its graphical user interface, which currently has "focus". Any non-spatial input events received from the operating system are directed by the active component, which in turn may direct the input event to a control having focus. In response to receiving a non-spatial input event, a first component which currently is active, determines whether to process the input event, or whether another component should becoming active to process the input event. For example, the component may determine whether to process the input event with a control that currently has focus, to change focus to another control of the graphical user interface of the component, or whether focus should be transferred to a control in another, second component. If another component should process the input event, for example of focus should be transferred to a control in another component, then the operating system is instructed to make the other component the active application. That other component can be provided with data allowing the component to determine which control has focus.

In general, a child component can indicate to a parent component that focus is leaving the child component; or a parent component can indicate to a child component that focus is being transferred to the child component. When focus is to be transferred from a first component to a second component in response to a non-spatial input event, the first component initiates a transfer by sending a request to the second component indicating the input event, and optionally coordinates of the control of the first component which last had focus. Further input events for the combined application optionally can be queued. The second component, to which focus is being transferred, receives and processes the request. The second component determines whether a control of the second component will now have focus, or if focus is further being transferred by the second component to yet another, third component, such as a parent component or child component of the second component.

If the second component sets focus to one of its controls, then the second component indicates to the operating system that focus will be transferred to the second component. Otherwise, the component that ultimately determines that one of its controls will have focus indicates to the operating system that focus will be transferred to that component. The operating system then updates state information maintained for applications being executed, to indicate which component is becoming the active component. After such updates are made, the operating system informs the components that state has been updated and which component is active. Any queued input events for the combined application then can be released for processing to the active component, and the control with focus in that component.

An operating system can provide services, i.e., processes providing specific functions, which components can use to implement such a protocol. For example, an operating system can provide a service that stores information about which application is active. As another example, an operating system can provide a service that manages transitions of applications among various states. In response to a request from a component to make another component active, such a service can ensure the transition is made. As another example, an operating system can have a service that provides a broker function to manage inter-process communications among components.

Such a protocol can be used by program elements for a variety of kinds of non-spatial inputs. For example, directional navigation input events can be processed to change which user interface control has focus. In response to a directional navigation input event, the program elements coordinate to change which program element is active, and a program element that becomes active can determine which user interface control has focus. As another example, command input events can be processed to determine which program elements should process the input events. In response to a command input event, the program elements coordinate to change which program element is active, and a program element that becomes active can determine how to process the command input event.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
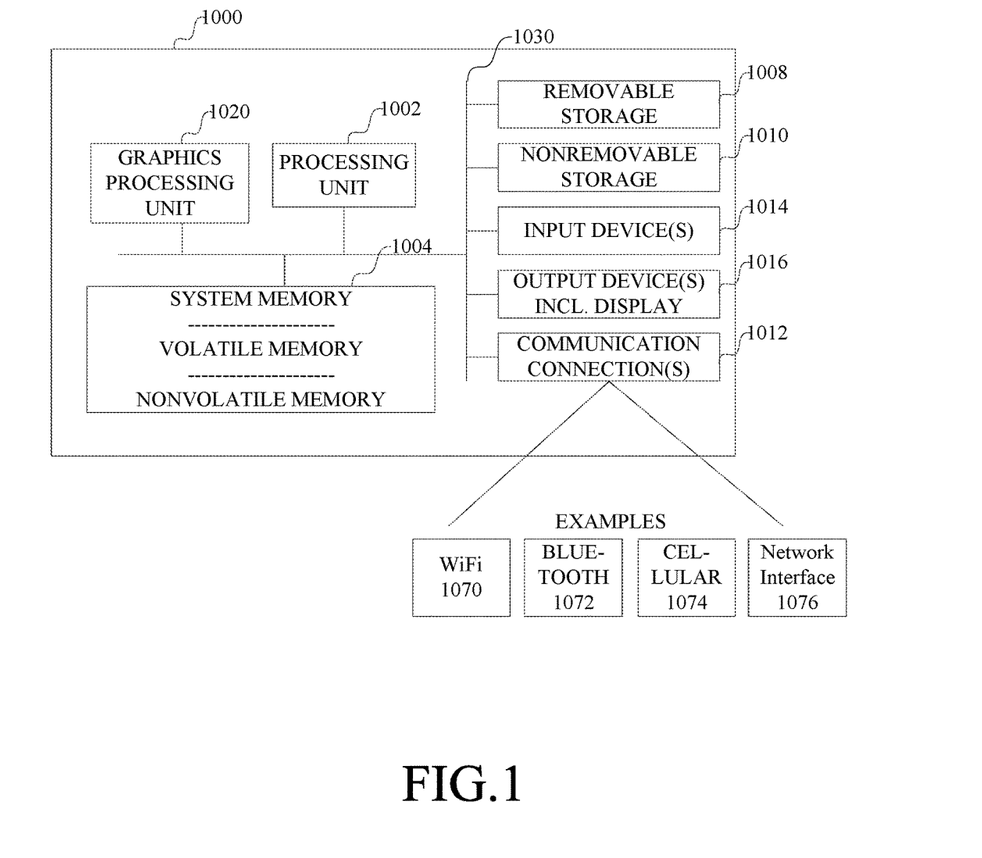
FIG. 1 is a block diagram of an example computer.

FIG. 1 illustrates an example of a computer with which techniques described herein can be implemented. This is only one example of a computer and is not intended to suggest any limitation as to the scope of use or functionality of such a computer. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 1, a computer 1000 includes a processing system comprising at least one processing unit 1002 and at least one memory 1004. The processing unit 1002 can include multiple processing devices; the memory 1004 can include multiple memory devices. A processing unit 1002 comprises a processor which is logic circuitry which responds to and processes instructions to provide the functions of the computer. A processing unit can include one or more processing cores (not shown) that are multiple processors within the same logic circuitry that can operate independently of each other. Generally, one of the processing units in the computer is designated as a primary processor, typically called the central processing unit (CPU). Additional co-processing units, such as a graphics processing unit (GPU) 1020, also can be present in the computer. A co-processing unit comprises a processor that performs operations that typically supplement operations provided by the central processing unit, such as but not limited to graphics operations and signal processing operations.

The memory 1004 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 1000 can include additional computer storage devices (whether removable or non-removable) such as, but not limited to, magnetically-recorded or optically-recorded disks or tape. Such additional computer storage devices are illustrated in FIG. 1 by removable storage device 1008 and non-removable storage device 1010. Such computer storage devices 1008 and 1010 typically are nonvolatile storage devices. The various components in FIG. 1 are generally interconnected by an interconnection mechanism, such as one or more buses 1030.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 1004, removable storage 1008 and non-removable storage 1010 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 1000 may also include communications connection(s) 1012 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 1012 are devices, such as a wired network interface, wireless network interface, radio frequency transceiver, e.g., Wi-Fi 1070, cellular 1074, long term evolution (LTE) or BLUETOOTH interface 1072, etc., transceivers, navigation transceivers, e.g., global positioning system (GPS) or Global Navigation Satellite System (GLONASS), etc., transceivers, and network interface devices 1076, e.g., Ethernet, etc., or other device, that interface with communication media to transmit data over and receive data from signal propagated over the communication media.

The computer 1000 may have various input device(s) 1014 such as a pointer device, keyboard, touch-based input device, pen, camera, microphone, sensors, such as accelerometers, thermometers, light sensors and the like, and so on. The computer 1000 may have various output device(s) 1016 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 1008 and 1010, communication connections 1012, output devices 1016 and input devices 1014 can be integrated within a housing with the rest of the computer, or can be connected through various input/output interface devices on the computer, in which case the reference numbers 1008, 1010, 1012, 1014 and 1016 can indicate either the interface for connection to a device or the device itself as the case may be.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 1. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. Thus, the file system hides the physical storage locations of data from applications running on the computer, allowing applications to access data in a file using the name of the file and commands defined by the file system. A file system generally provides at least basic file operations such as creating a file, opening a file, writing a file or its attributes, reading a file or its attributes, and closing a file.

The various modules, tools, or applications, and data structures and flowcharts of FIGS. 2-8, as well as any operating system, file system and applications on a computer in FIG. 1, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Given such a computer as shown in FIG. 1, the operating system manages execution of an executable computer program as an "application" with one or more "processes". An "application" is an entity for which the computer program stores and manages state and process information in memory, an example of which is described in more detail below. The term "process" herein means a sequence of programmed instructions for which execution can be managed independently by an operating system, such as for scheduling and bindings, and for which a set of memory locations in memory 1004 are allocated. A process generally cannot access the memory allocated to another process. A process has one or more threads; a thread is an independent stream of execution, which can be independently managed and scheduled on a processor, and can share memory locations in memory 1004 with other threads of a same process. Different processes and threads of a same application generally can invoke operations of other processes and threads of the same application. Thus, an application, when executed, can result in multiple processes and threads being managed by the operating system. A thread also can include different frameworks for implementing parts of the application, such as different user interface frameworks within a user interface thread of the application. As used herein, an application, a component (described below), a process, a thread and an application framework, are all forms of "program elements".

When an application is created, it can include multiple computer programs which are combined together. These multiple computer programs, when the application is executed, can result in multiple processes and threads being managed by the operating system for that application.

In some cases, a single combined application is built using multiple "components", which are separate applications that are combined together when executed into what appears to be a single, combined application. In general, the single combined application has one main component, called a host component, which refers to and uses one or more other hosted components. These other components, in some implementations, may include yet other components. In general, as described herein, each component is managed and executed from the perspective of the operating system as a separate application; however, the graphical user interfaces of the components are combined, based on information from the host component, into a single combined graphical user interface for what appears to a user as a single, combined application.

As an illustrative example of a combined application defined using a host component and other components, reference is now made to FIGS. 2-5.

Figure 2:
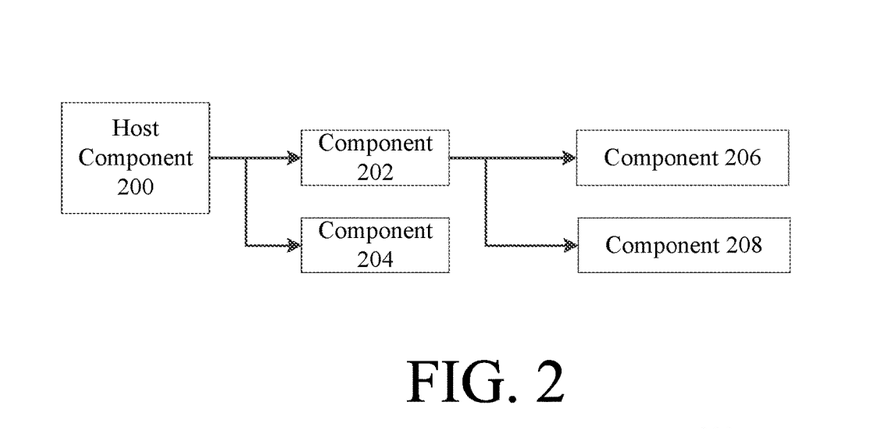
FIG. 2 is an illustrative example of a tree-like structure of an application including a host and multiple components.

In FIG. 2, the tree like structure of such a combined application is illustrated by way of an example. A host component 200 includes a first component 202 and a second component 204. Arrows in FIG. 2 illustrate inclusion of a component in another component. For the sake of this example, the first component 202 includes a third component 206 and a fourth component 208. Host component 200 provides a graphical user interface of the application. Components 202 and 204 also have their own graphical user interfaces. The graphical user interfaces of components 206 and 208 are combined in the context of the graphical user interface of component 202 to make the graphical user interface of component 202. The graphical user interfaces of components 202 and 204 are combined in the context of the host component's graphical user interface 200 to provide the graphical user interface of the application.

Figure 3:
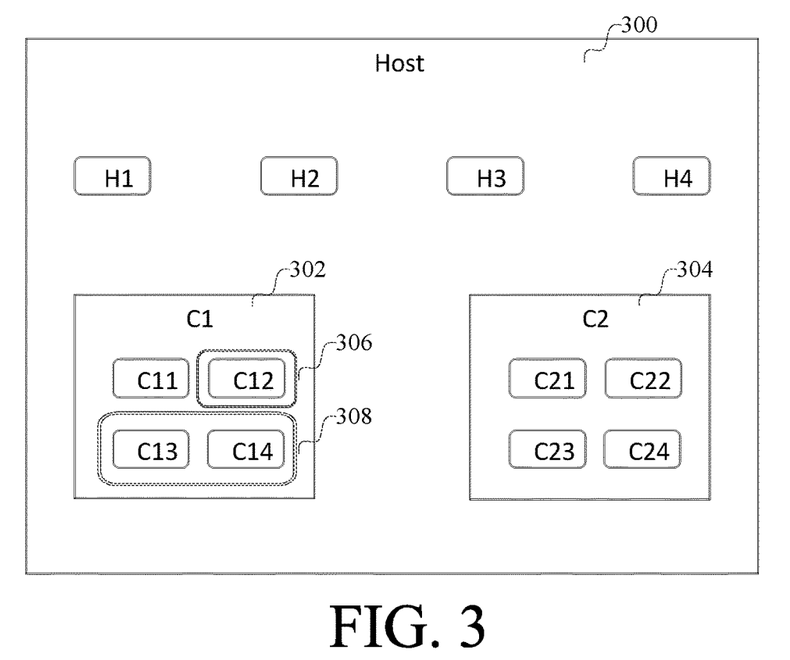
FIG. 3 is an illustrative example of a display image for a graphical user interface corresponding to the application of FIG. 2.

In FIG. 3, an illustrative example of a display image for a graphical user interface of a combined application corresponding to FIG. 2 is shown. The graphical user interface of the host component 200 is shown at 300. Likewise, the graphical user interface for component 202 is shown at 302; for component 206 is shown at 306; for component 208 is shown at 308; for component 204 is shown at 304. Labels H1-H4 are controls in the graphical user interface 300 of the host component 200. Label C11 is a control in the graphical user interface 302 of component 202. Label C12 is a control in the graphical user interface 306 of component 206. Labels C13 and C14 are controls in the graphical user interface 308 of component 208. Labels C21-C22 are controls in the graphical user interface 304 of component 204.

A graphical user interface generally allows a user to interact with an application on a computer by presenting output data on an output device, typically visual data on a display device, and by receiving and processing input data from an input device manipulated by the user. A "control" in the graphical user interface is typically a graphical element which, in response to input data related to that graphical element, causes the application to perform an operation. There is a wide variety of types of controls and operations which can be performed in response to manipulation of such a control.

Generally speaking, there are two types of input data: spatial input and non-spatial input. Spatial input is any input data which includes location information, such as coordinates or offsets, which corresponds to a location on the display. Spatial input typically is received from pointing devices such as such as a mouse, trackball, touch screen, etc.

Non-spatial input data does not include such location information. Thus, a "non-spatial input" is any input event for which the input data does not include display location information. Examples of non-spatial input include, but are not limited to, input from a keyboard device and inputs based on speech recognition. Such keyboard devices generally provide input events that indicate one or more keys on a device have been pressed. The key or combination of keys is translated by the operating system and/or an application into a command to be performed. Generally, some keyboard commands are conventions specified by an operating system; other keyboard commands may be specific to an application, whether a host component or other component of the application. For example, some non-spatial input events, such as arrow keys and tab keys, can indicate that the user wants to change the control with focus in the user interface. Such input events are referred to herein as "directional navigation" input events. As another example, some non-spatial input events indicate a command to be performed. Such input events are referred to herein as "command" input events. A command input event generally has two types. A first type is sometimes called a "hot key" input event, which can be a defined by a press of a single key, or a combination of keys, or a sequence of keystrokes, which results in a command being directed to an application. A second type is sometimes called a "mnemonic" input event, which generally involves a keystroke that initiates another mode of processing subsequent input events. For example, a keystroke may activate a menu in a graphical user interface, and further keystrokes allow for navigating the menu. Some non-spatial input events are simply keystrokes or other inputs that are directed to the currently active process, which in turn can direct the input event to a control with focus or otherwise process the input.

When a control is represented by a graphical element on the display, such as the controls in FIG. 3, and an input event includes spatial input, then the input data is readily correlated with a control, based on the coordinates of the control on the display and the location information from the input data. For non-spatial input, a process generally stores state information indicating a control of the graphical user interface that has "focus". The control with focus is commonly a default control to which non-spatial input can directed.

Figure 4:
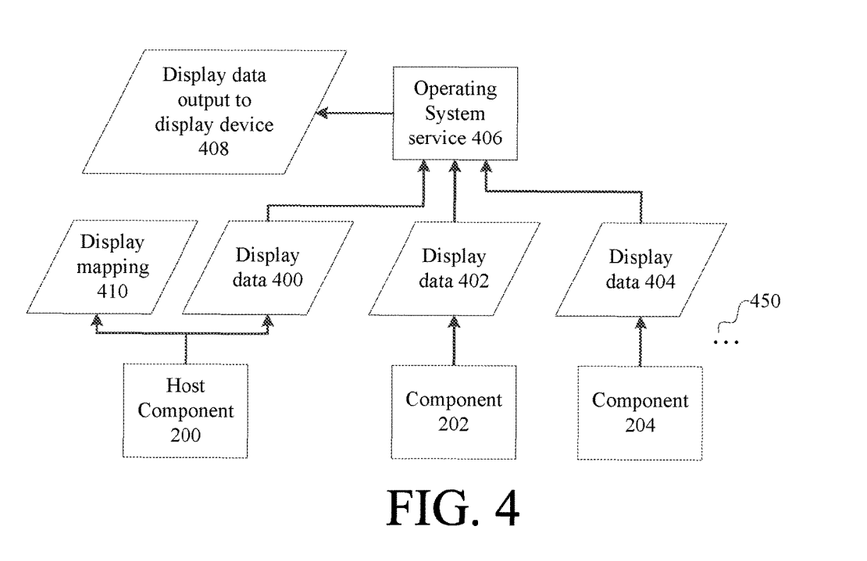
FIG. 4 is an illustrative example of how display data is combined to produce the image of FIG. 3.

Referring now to FIG. 4, generation of the display data for a combined application that includes many components will now be described. The host component 200 provides display data 400 for part of the graphical user interface of the application. Some of the display data 402 and 404, and yet other display data (signified by ellipsis 450), for the graphical user interface originates from the other components 202 and 204, and yet other components (signified by ellipsis 450), respectively. While each component 202, 204, etc., generates its own display data, the host component 200 generally determines where the display data generated by the other components will be displayed with respect to its display data 400 and provides this display mapping information 410 to the operating system.

The operating system has a service 406 which combines the display data of the host component with the display data of its other components, based on the information from the host component. This operating system service also can determine where, on the display device, the combined display data 408 is displayed as the graphical user interface for the combined application in the context of other applications. The operating system also can store state information in memory about each component, such as which component is an active application. Thus, for input events that include spatial inputs, the operating system can readily determine which component receives the input event, can make that component the active component, and can provide the input event to that component.

Figure 5:
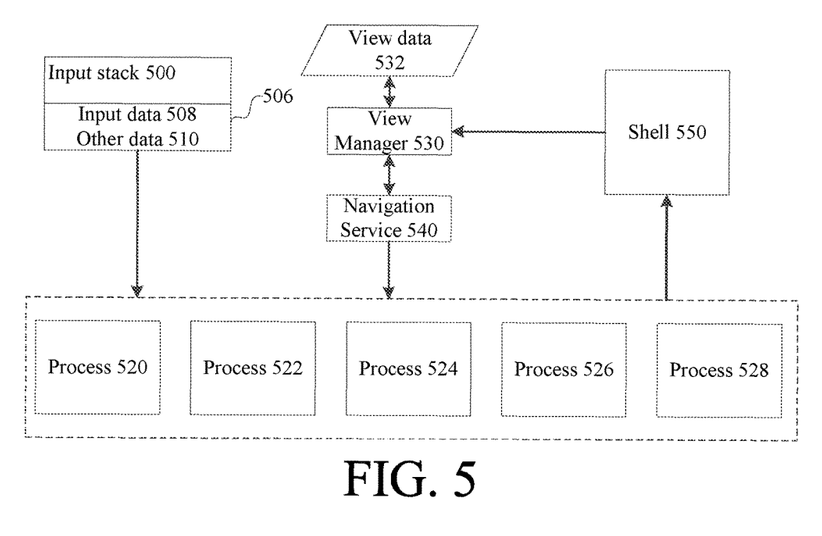
FIG. 5 is a block diagram of an example implementation of an operating system with services to support applications with components for directional navigation of focus using non-spatial inputs.

Turning now to FIG. 5, a protocol for processing of non-spatial input events by an operating system and processes will now be described. FIG. 5 is a block diagram of an example implementation of operating system services and processes implementing this protocol for processing directional navigation non-spatial inputs as described below.

In this example in FIG. 5, there are five processes 520, 522, 524, 526 and 528, corresponding to the five components shown in FIGS. 2 and 3. The dashed line around these processes signifies that the processes are managed as separate applications by the operating system, i.e., they are components, yet are treated as a single combined application, where one process 520 represents a host component and the remaining processes 522-528 represent hosted components.

An operating system of a computer generally maintains an input stack 500 that receives input data from input devices connected to the computer. The input stack 500 generally stores, for each input event as indicated at 506, input data 508 from an input device and other data 510 about the input event. Such other information depends on the operating system, and can include information such as the input device from which the input data originated and/or a system time at which the input event occurred and/or other data.

Input events in the input stack can be directed to the operating system and its services, or to applications and their processes. In some implementations, the operating system determines the process executed on the computer to which an input event is directed. In other implementations, a process can determine whether an input event is directed to the process. After such a determination, the input event can be added to an input queue (not shown) for the process.

As noted above, for a spatial input, identifying the process to which the input event is directed is readily made, based on the display location of the process' graphical user interface and the location information from the spatial input. The process can in turn handle the spatial input event.

For a non-spatial input, the operating system uses additional information to determine a process to which the non-spatial input is directed. Such additional information can be information indicating which process the operating system considers "active".

In one implementation, to manage directing input events to components, an operating system can store and manage information in memory about each application being executed on the computer. The information stored about an application is called herein a "view". The operating system service that manages such information is called herein a "view manager" 530. The view manager labels at least one of the views as an "active" view. A system can have multiple active views, for example if there are multiple users and/or multiple bindings of different input devices to different applications. Generally speaking, non-spatial input events are directed from the input stack 500 to the application having the active view.

The view manager 530 can store such view data 532 in many different ways, depending on the operating system. For example, with operating systems which support components, the data 532 can include a view for each component. The view for a component can include an indication of whether the component is a host component or a hosted component. A view for a host component can include an indication of any hosted components, and an indication of whether any of the hosted components is currently active. As another example, for applications with multiple processes, the data 532 can include a view for each application, and can include an indication a main process and any other processes used by the application. The data 532 can include an indication that an application is active, and whether any particular process for that application is considered active for the purpose of receiving input events for the application.

The view manager 530 can store such view data 532 in many different formats, depending on the operating system. For example, a list of views can include an indication for each view whether the view is active. As another example, an identifier of the view which is active can be stored. Similarly, for each view, the system can store data representing a list of processes. Data representing a process in the list of processes can include an indication whether the process receives input events for the application.

Whether an application is the active application generally depends on how the operating system manages the graphical user interface of the computer. In some operating systems, the graphical user interface of only one application is visible to a user at time, and the visible application is active. In some operating systems, the graphical user interfaces of multiple applications can be visible, yet only one application is allowed to be "active." As shown in FIG. 5, the operating system "shell" 550 is the portion of the operating system that manages the graphical user interface. Generally speaking, the shell determines which application is active, and determines whether an application requesting to be active will be allowed to become active, and processes some user input events to determine whether a transition should be made from a currently active application to make another application active.

The shell 550 communicates which application should be active to the view manager 530. The view manager 530 instructs a navigation service 540, for any applications for which state is changing, to transition those applications from one state to another. For example, an application may need to be transitioned from an idle state through other states before ultimately being recognized by the navigation service 540 as being active. The navigation service also can communicate with the applications about these state transitions. The navigation service can inform the view manager when the transitions are completed, which in turn can inform the shell when the view data has been updated.

Input events that can cause a transition of a process from active to inactive, or inactive to active, or other state transition, are called navigational inputs. Directional navigational inputs are non-spatial inputs that are intended to change state of a process based on a direction inferred from an input event. An example of such navigation is changing focus from one control to another control in a graphical user interface in response to a keyboard input such as a tab key or an arrow key.

There are several conventions for behavior of graphical user interfaces with respect to directional navigational inputs. In general, the operating system provides a platform in which applications running on that operating system conform to a convention. For example, forward and backward navigation among controls may be defined by TAB and shift-TAB keys. Forward group and backward group navigating may be defined by F6 and shift-F6 keys. Yet other navigation may be defined for arrow keys, predetermined keys and combinations of keys, also called command input events, such as the alt-key in combination with other keys, or the escape or ESC key. Some input events can result in resuming, starting or ending focus in an application, instead of navigating focus.

When multiple processes are executing on a computer, the processes together implement a protocol to manage which process is currently active to receive input events from the operating system. An active process also can have a control of the graphical user interface which currently has "focus", meaning any received input events generally are directed to this control. In response to receiving an input event, a first process which currently is active, determines whether to process the input event with a control that currently has focus, to change focus to another control of the graphical user interface, or whether focus should be transferred to a control managed by another process.

When the application being executed is a combined application, including a host component and other components, the components together implement such a protocol. Thus, the components cooperate to manage which component is a currently active application to receive input events from the operating system. An active component also can have a control of the graphical user interface which currently has "focus", meaning any received input events generally are directed to this control. In response to receiving an input event, a first component which currently is active, determines whether to process the input event with a control that currently has focus, to change focus to another control of the graphical user interface of the component, or whether focus should be transferred to a control in another, second component. If focus should be transferred to a control in another component, then the currently active component provides the other component with information from which that component can determine whether it has a control to which focus should be transferred, or whether yet another component should be considered. When a component determines that it should have focus, it then submits a request to the operating system to become the active component. Thus, after the host component and the hosted components determine which component is active, the operating system services 550, 540 and 530 are invoked to effect the change. While the change is occurring, input events directed to the combined application can be queued.

Figure 7:
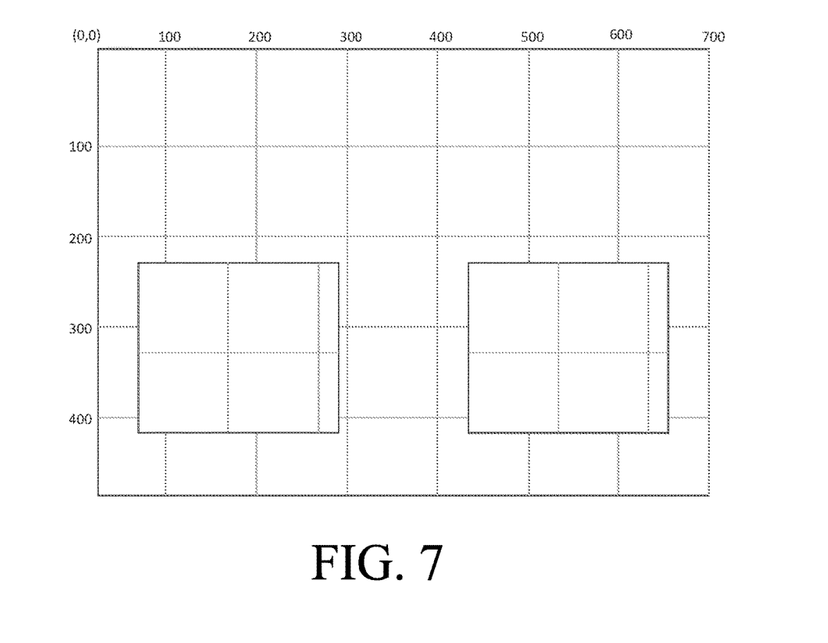
FIG. 7 is an illustrative example of a coordinate system used to map components to a display area of a host.
Figure 8:
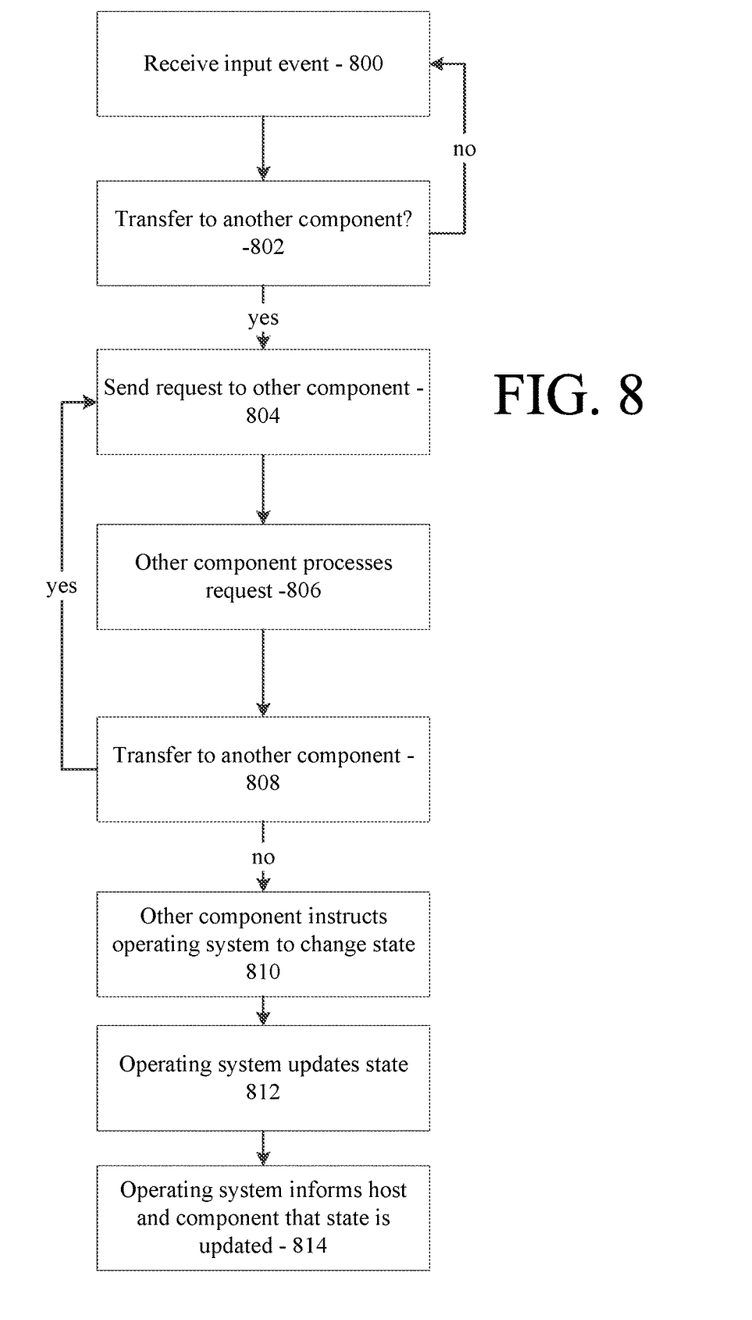
FIG. 8 is a flow chart of an example implementation of a directional navigation protocol.

An example implementation of a directional navigation protocol for use with components will now be described in connection with FIGS. 6-8.

Figure 6:
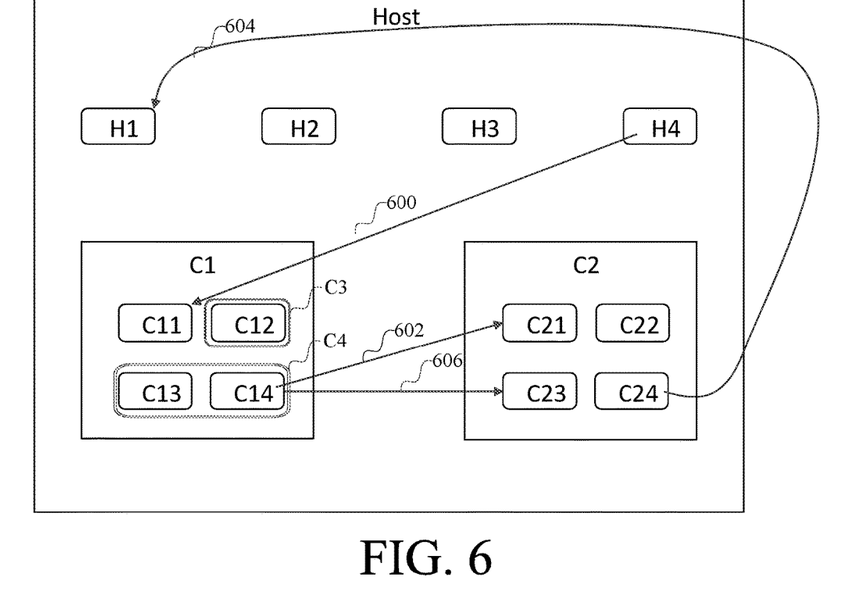
FIG. 6 is an illustrative example of transitions of focus among a host and its components.

Illustrative example scenarios of directional navigation, using a graphical user interface of a combined application such as shown in FIG. 3, are shown in FIG. 6. As one example, if the host component is active, and control H4 has focus, then in response to an input event from a tab key, the active component can become component C2, and control C11 can have focus, as indicated at 600. As another example, if component C4 is active and control C14 has focus, then in response to an input event from a tab key, the active component can become component C2, with control C21 having focus, as indicated at 602. As another example, if component C2 is active with control C24 having focus, then in response to an input event from a tab key, the active component can become the host component, with control H1 having focus, as indicated at 604. As another example, if component C4 is active with control C14 having focus, then in response to an input event from a right arrow key, the active component can become component C2 with control C23 having focus, as indicated at 606.

Generally speaking, each component has its own list of controls and subcomponents for such navigation purposes. For example, to process tab inputs, such a list may be called a list of tab stops. While it is feasible for different processes of an application to share such a list, such sharing may not be possible or desirable if the processes are separate, independent applications.

In general, in response to a particular input event, a process uses its list to identify either the next control managed by the process or another process to which focus changes. A process may determine that the last control within its scope has been reached and that focus should transition to another process of the application or to the shell or operating system.

For combined applications, in response to a particular input event, a component uses its list to identify either the next control within the component or the subcomponent to which focus changes. A component may determine that the last control within its scope has been reached and that focus should transition to its parent component. As a special case, a host component may determine that focus should transition to the operating system.

For combined applications, to assist in determining which component should become active, and which control should come into focus, the system can store for each view, the relative coordinates of display for each hosted component within the coordinate system of the display for the host component. As an illustrative example, as shown in FIG. 7, a host component is defined to have a coordinate system of 0 to 700 pixels on the horizontal axis and 0 to 500 pixels on the vertical axis. Within this coordinate space, a first component has a coordinate space of 0 to 225 pixels on the horizontal axis and 0 to 200 on the vertical axis, with the upper left point (0, 0) situated at the coordinates (60, 230) in the host coordinate system. Similarly, a second component has a coordinate space of 0 to 225 pixels on the horizontal axis and 0 to 200 on the vertical axis, with the upper left point (0, 0) situated at the coordinates (430, 230) in the host coordinate system. When one component transfers control to another component, the component can provide coordinates of the control last having focus along with the input event. The other component which receives this information can determine the control which should have focus based on the input event and provided coordinates. To enable each component to make such a determination using its own coordinate space, the operating system can convert the provided coordinates between the host and component coordinate systems.

A general overview of an example implementation of a directional navigation protocol for component-based, combined applications will now be described in connection with the flowchart of FIG. 8. Such a protocol also can be implemented by processes of a same application, particularly if these processes are unable to share information easily about how navigational inputs are processed.

In response to receiving 800 an input event, a first component which currently is active and has a control with focus, determines 802 whether to change focus to another control within the component, or whether it should transfer focus to another, second component. In general, a first component can indicate to its parent component that focus is leaving the first component; or the first component can indicate to a subcomponent that focus is being transferred to the subcomponent. If focus is to be transferred, the first component initiates 804 the transfer by sending a request to the second component indicating the input event and coordinates of the control of the first component which last had focus. Further input events for the combined application can be queued.

The second component, to which focus is transferred, receives and processes 806 the request to determine the control of the second component to which focus is to be transferred. It is possible that the second component may determine 808 that focus should be transferred to yet another, third component, in which case steps 804 and 806 are repeated with the second and third components now as the first and second components respectively. Otherwise, the second component sets focus to its next control. The second component then indicates 810 to the operating system how focus has been transferred. The operating system updates 812 the stored view information to indicate the changes in state, activating the new component with the control with focus. After such changes are made, the operating system informs 814 the host and component that the state has been updated. Queued input events then can be released to the active component for processing according to the changed focus.

Turning now to FIG. 6, the example scenarios will now be described in the context of the protocol of FIG. 8. In the transition 600 from control H4 of the host component to control C11 of the first component C1, the host determines, in response to an input event such as a tab input, that the next control after H4 is in the first component C1. The host component initiates the transfer to component C1 by sending a request to component C1 indicating the input event and the coordinates of control H4. Further processing of input events can be suspended. Component C1 receives this request and determines that control C11 is the next control to receive focus and sets focus accordingly. Component C1 requests the operating system, such as by a message to the shell, to make component C1 the active component with control C11 as the target control. The operating system deactivates the host component, and activates the first component C1. The operating system then can inform the host component and the first component that the state change has been completed. After the state change is completed, first component C1 can continue processing subsequent input events.

In the transition 602 from control C14 of the fourth component C4 to control C21 of the second component C2, the fourth component determines, in response to an input event such as a tab input, that the next control after control C14 is not in the fourth component C4. Since the fourth component does not know to which control or component to transfer focus, the fourth component initiates the transfer by sending a request to its parent component, in this case the first component, indicating the input event and the coordinates of control C14. Further processing of input events can be suspended. The first component receives this request and also determines that the next control after control C14 is not in the first component C1 either. Since the first component does not know to which control or component to transfer focus, the first component initiates the transfer by sending a request to its parent component, in this case the host component, indicating the input event and the coordinates of control C14.

The host component receives this request and determines that the second component C2 contains the next control to receive focus. The host component initiates the transfer to component C2 by sending a request to component C2 indicating the input event and the coordinates of C14. Component C2 receives this request and determines that control C21 is the next control to receive focus and sets focus accordingly. Component C2 requests that the operating system, such as by a message to the shell, make component C2 active with control C21 as the target control. The operating system deactivates the fourth component C4, and activates the second component C2. The operating system then informs the components of the state change. After the state change is completed, second component C2 can continue processing subsequent input events.

In the transition 604 from control C14 of the fourth component C4 to control C23 of the second component C2, the fourth component determines, in response to an input event such as a right arrow key input, that the next control after control C14 is not in the fourth component C4. Since the fourth component does not know to which control or component to transfer focus, the fourth component initiates the transfer by sending a request to its parent component, in this case the first component, indicating the input event and the coordinates of control C14. Further processing of input events can be suspended. The first component receives this request and also determines that the next control after control C14 is not in the first component C1 either. Since the first component does not know to which control or component to transfer focus, the first component initiates the transfer by sending a request to its parent component, in this case the host component, indicating the input event and the coordinates of control C14.

The host component receives this request and determines that the second component C2 contains the next control to receive focus. The host component initiates the transfer to component C2 by sending a request to component C2 indicating the input event and the coordinates of control C14. Component C2 receives this request and determines that control C23 is the next control to receive focus and sets focus accordingly. Component C2 requests the operating system, such as by a message to the shell, to make component C2 the active component with control C23 as the target control. The operating system deactivates the fourth component C4, and activates the second component C2. The operating system then informs the components of the state change. After the state change is completed, second component C2 can continue processing subsequent input events.

In the transition 606 from control C24 of the second component C2 to control H1 of the host, the second component determines, in response to an input event such as a tab input or right arrow input, that the next control after control C24 is not in the second component C2. Since the second component does not know to which control or component to transfer focus, the second component initiates the transfer by sending a request to its parent component, in this case the host component, indicating the input event and the coordinates of control C24. Further processing of input events can be suspended. The host component receives this request and determines that the next control to receive focus is not in the host component. The host component can initiate a transfer to another application by informing the operating system of the input event and the coordinates of control C24. The operating system shell can determine, based on the user interface it implements, whether focus should remain in the host component or whether focus should be transferred to another application. Assuming transfer should remain in the host component, the shell sends a request to the host indicating the input events and the coordinates of the control C24. In turn, the host component determines that control H1 is the next control to receive focus and sets focus accordingly. The host component requests the operating system, such as by a message to the shell, to make the host component the active component with control H1 as the control with focus. The operating system deactivates the second component C2, and makes the host component active. The operating system then informs the components of the state change. After the state change is completed, the host component can continue processing subsequent input events.

Implementation of such a protocol is dependent, in part, on the implementation of the operating system and how the operating system manages applications, processes and views. This protocol was designed to work with an operating system which supports combined applications where host components and its hosted components are executed as separate, independent applications. In such a system, the communication between a host component and a hosted component is implemented using a form of inter-application communication. There are several forms of inter-application communication that can be used, such as remote procedure calls, messaging, event handling, call-back functions and the like.

The protocol can work, however, with applications in which a host computer program and another computer program which it uses are executed in separate threads of a same process. In such a system, communication between the parts of a computer program can be implemented using any form of cross-process or cross-thread communication as well.

The following describes an example implementation using event handlers for components. A host component and hosted components each have event handlers for processing specific messages from other components. A host component can cause an event to be generated, which is handled by a component's event handler. Similarly, a component can cause an event to be generated, which is handled by its host's event handler. The operating system can provide a broker service which allows a method calls by one component to cause an event to be generated for handling by another component. Such a broker service can allow one component to register event handlers that the component has, and events that the component recognizes, and can allow the component to specify other components from which the component will recognize the events. Thus, the broker service allows a host component and a hosted component to securely establish a way to instruct each other to perform operations.

In a particular implementation, each component can be implemented in an application framework in which each component has an object class that manages the input, output and user interface framework for the component. This object class is called the component's window object herein. A host component has a hosting object corresponding to the window object for each hosted component. A hosting object has a "navigate focus" method and an event handler for handling "focus departing" events from the corresponding window object of a hosted component. A window object of a hosted component has a "depart focus" method and an event handler for handling "focus navigating" events from a corresponding hosting object of a host component.

The "depart focus" method is used by the window object of a component to transition focus to a control other than a control in the component, making the component inactive. Each window object for a component has a "depart focus" method. This method fires an event which invokes, through the broker, a corresponding event handler of its hosting object in the parent component. The event provides the input event and coordinates of the departing component's control currently having focus. The parent component then can transition focus to a control in the parent component or in another component determined by the parent component. The component invokes this method in response to identifying that, in response to the input event, focus should be navigated to a control in another component. In particular, the "depart focus" method of the window object of a component fires a "focus departing" event to the hosting object of the parent component through the broker. The corresponding event handler of the hosting object of the parent component processes the event. The parent component determines the next control to which focus transitions and effects that transition.

The "navigate focus" method is used by a hosting object of a host component to transition focus to a control in another component, making that other component active. Each hosting object has a "navigate focus" method. This method fires an event which invokes, through the broker, a corresponding event handler of the window object of the other component. The event provides the input event and coordinates of the host component's control currently having focus. The hosted component then can transition focus to a control within the hosted component, as determined by the hosted component. The host component invokes this method in response to identifying that, in response to the input event, focus should be navigated to a control in the hosted component. In particular, the "navigate focus" method of a hosting object, of a host component, corresponding to the window object of a hosted component, fires a "focus navigating" event to the hosted object through the broker. The corresponding event handler of the window object of the hosted component processes the event. The hosted component determines the next control to which focus transitions and effects that transition.

In the foregoing example, a component determines, in response to a "focus navigating" event, whether the component has a control which will have focus, and thus also becomes whether the component becomes active. The event handler for the focus navigating event, in response to such a determination, also can notify the shell that the component is becoming active. The shell can then instruct the view manager to change the component's status to active, and deactivate other components. The view manager may request the navigation server to manage the state transitions of various components, and inform the component when the transition is complete.

With the navigation protocol described above in connection with FIG. 8, transitions in the active state for processing non-spatial inputs can be effected even when components of a combined application are managed by the operating system as separate applications. However, the protocol can be used where two processes are on the same thread, or with different threads within the same process, or with different processes within the same application, or with different applications.

In the examples provided above, the requests to change focus between applications provide both the input event and location information, e.g., coordinates, for a control that currently has focus in the currently active component. The protocol also works in systems in which only input events are provided to other components. Also, additional information such the component from which a transition started, a type of transition or other information also can be exchanged among components. The protocol described above also can be modified to allow for transitions to be aborted or interrupted based on new user input or if a process of finding a new active component takes too long. For example, the operating system can evaluate the time or transition type associated with an input event to determine whether to reject a request to make another program element active based on that input event. A difference in the time of the input event and the current time can be compared to a threshold, for example. The threshold can be dependent on the type of transition.

A process for handling command input events, such as hot keys (also called accelerators) and mnemonics, can be considered similar to the process for handling directional navigation input events, in that the components of a combined application coordinate to determine which component should process the input event. If the component to process the input event is not the currently active component, then the component to process the input event sends a request to the operating system to make that component the active component, after deactivating the otherwise currently active component. The protocol used by the components to coordinate such a decision is different for mnemonic inputs than for directional navigation inputs.

For example, for hot keys, the input stack 500 can coordinate with the view manager 530 to use the view data 532 to determine, given the currently active component, a path to a root component. This path includes the host component and the other components that ultimately contain the active component. For example, in FIG. 2, the path to the root from component 208 includes component 202 and component 200. The input stack can determine this information from the view data 532. The system can then determine which component along this path will process the input event. In some implementations, each component can register its "hot keys" with the view manager, and the input stack can determine, from the registered information, the component to which the hot key input event should be provided. In some implementations, each component can be queried for whether it can process the hot key.

In some implementations, it is possible that a host component and a hosted component each have a behavior associated with a particular hot key input event. For example, each component may have its own dialog interface in response to a "save as" command. In one implementation, such input events can be defined either explicitly or implicitly to be either a default condition or an override condition. For example, any behavior specified as an "override" condition can be enabled by traversing a hierarchy of components from the host component to the currently active component, then back up to the host component. The last component encountered that can handle the input event processes the input event. Thus, when traversing from the host component to the currently active component, any host component is first given the opportunity to override any processing by the currently active hosted component. Subsequently, when the hierarchy is traversed from the currently active component back up to the host component, any hosting component can provide default processing for any input event not handled by its hosted component.

When it is determined which component is to receive the input event, that component can send a request to the operating system to make that component the active component. In some cases, after the operating system makes that component active, the component processes the input event. In some cases, the component processes the input, which results in the operating system making the component active.

Another command input event, mnemonic input events, will now be described in more detail. Similar to a command input event, a mnemonic input event begins with an input, such as a keystroke, which is intended to invoke another user interface component, such as a menu. Thus, for a combined application, such an invocation can involve activating a mode of a host component, such as processing menu commands, for processing further mnemonic input.

Thus, in response to such an input event, the input event can be directed to a host component of a combined application. The host component causes data indicating the current focus of its user interface framework to be stored. The host component changes focus to its user interface framework that processes mnemonic input. The host component requests, if it is not the active component, that the operating system make the host component active. After the operating system makes the host component active, the host component can process further mnemonic inputs until that mode is exited by the user, by either selecting an operation to perform or exiting the mode. When the mnemonic mode is exited by the user, the host component can restore the focus within its user interface framework to the previously stored state. Changing which component is active at the time of entering the mnemonic mode, and at the time of exiting the mnemonic mode and restoring the prior state, can be performed through requests by a component to the operating system to make that component active.

In some implementations, for a combined application, different components each can have their own mnemonic mode. In some implementations, when a mnemonic mode is activated, the mode can be activated for a currently active component, or for any other component that contains it in the hierarchy of components in the combined application. In some implementations, while in a mnemonic mode for one component, an input event can cause the focus to transition to a mnemonic mode for a hosting component or a hosted component. For example, an input event can be defined for a host component to transition to the mnemonic mode of a hosted component. Another input event can be defined for a hosted component to cause a transition back to the mnemonic mode for the host component. Such transitions can be effected by having the component, to which focus is transitioning, request the operating system to become the active component.

In some implementations, wherein information about mnemonic modes is registered with the operating system, mnemonic modes of multiple components may be combinable by the host component.

In one aspect, a computer comprises a processing system comprising a processing unit and a memory, the processing system executing an operating system and computer programs, the computer programs including a first program element and a second program element, each program element having a state managed by the operating system indicative whether the program element is an active program element. The first program element and the second program element are executed by the processing system under management of the operating system. When the first program element is the active program element, in response to receiving a non-spatial input event, the first program element determines whether to request the second program element to process the non-spatial input event. The first program element sends, in response to a determination to request the second program element to process the non-spatial input event, a request to the second program element indicating the non-spatial input event. The second program element determines, in response to the request from the first program element, whether to become the active element. The second program element requests, in response to a determination to become the active element, the operating system to make the second program element the active program element. The operating system determines, in response to the request from the second program element, whether to activate the second program element. The operating system deactivates, in response to a determination to activate the second program element, the first program element, and updates stored information indicating states of at least the first program element and the second program element, and informs the first program element and the second program element that the state has been updated.

a computer comprises a processing system comprising a processing unit and a memory, the processing system executing an operating system and computer programs, the computer programs including a first program element and a second program element, each program element having a state managed by the operating system indicative whether the program element is an active program element. The first program element and the second program element are executed by the processing system under management of the operating system. When the first program element is the active program element, in response to receiving a non-spatial input event, the first program element determines whether to request the second program element to process the non-spatial input event. The first program element sends, in response to a determination to request the second program element to process the non-spatial input event, a request to the second program element indicating the non-spatial input event. The second program element determines, in response to the request from the first program element, whether to become the active element. The second program element requests, in response to a determination to become the active element, the operating system to make the second program element the active program element. The operating system determines, in response to the request from the second program element, whether to activate the second program element. The operating system deactivates, in response to a determination to activate the second program element, the first program element, and updates stored information indicating states of at least the first program element and the second program element, and informs the first program element and the second program element that the state has been updated.

Another aspect is a computer executing an operating system and computer programs, the computer programs including a first program element and a second program element, each program element having a state managed by the operating system indicative whether the program element is an active program element. The first program element and the second program element are executed by the processing system under management of the operating system. Each program element, when the active program element, includes means, operative in response to receiving a non-spatial input event, for requesting another program element to process the non-spatial input event. A program element also includes means, operative in response to a request from another program element to process a non-spatial input, for requesting the operating system to make the program element the active program element. The operating system includes means, operative in response to a request from a program element, to activate the program element.

Another aspect is a computer-implemented process in a computer that executes an operating system and computer programs, the computer programs including a first program element and a second program element, each program element having a state managed by the operating system indicative whether the program element is an active program element. The first program element and the second program element are executed by the processing system under management of the operating system. A program element, when the active program element, in response to receiving a non-spatial input event, can request another program element to process the non-spatial input event. A program element, in response to a request from another program element to process a non-spatial input, can request the operating system to make the program element the active program element. The operating system, in response to a request from a program element, can activate the program element.

In any of the foregoing aspects, the operating system can be operative to direct further non-spatial input events for processing to the second program element.

In any of the foregoing aspects, the non-spatial input event can be a directional navigation input event, or a mnemonic input event, or an accelerator input event. A directional navigation input event can indicate a previous control or a next control from a current control. The directional navigation input event can indicate a previous group of controls or a next group of controls from a current group of controls. The previous control or the next control can be defined by an ordered list of controls. The previous control or the next control can be defined by a direction and first coordinates associated with the current control and second coordinates associated with the previous control or the next control.

In any of the foregoing aspects, to send the request to the second program element, the first program element can be operative to call a method of the second program element. In such an implementation, to send the request to the second program element, the first program element can be operative to call a method of the second program element through a broker service of the operating system.

In any of the foregoing aspects, to determine whether to request the second program element to process the non-spatial input event, the first program element can be operative to determine whether to transfer focus of non-spatial input events to the second program element. In such an implementation, the request to the second program element can be a request from the first program element to a parent program element indicating focus is leaving the first program element. The request to the second program element can be a request to a subcomponent of the first program element indicating that focus is being transferred to the subcomponent. The second program element can be operative, in response to the request from the first program element, to determine whether to transfer focus to a third program element.

In any of the foregoing aspects, to determine whether to request the second program element to process the non-spatial input event, the first program element can be operative to determine whether to transfer focus of non-spatial input events from a first control of a graphical user interface of the first program element to a second control of a graphical user interface of the second program element. In such an implementation, the second program element can be operative to identify the second control to which focus is to be transferred, and to set focus to the second control. The request from the first program element to the second program element further can include coordinates of the first control of the graphical user interface of the first program element currently having focus. The request from the first program element to the second program element further can include a time associated with the non-spatial input event. The request from the first program element to the second program element further can include a kind of transition associated with the non-spatial input event.

In any of the foregoing aspects, to determine whether to request the second program element to process the non-spatial input event, the first program element can be operative to determine whether to transfer focus of non-spatial input events from a first group of controls of a graphical user interface of the first program element to a second group of controls of a graphical user interface of the second program element. The second program element can be operative to identify a second control in the second group of controls to which focus is to be transferred, and to set focus to the second control.

In any of the foregoing aspects, to determine whether to activate the second program element, the operating system can be further operative to determine whether to reject the request based on a time associated with the non-spatial input event. The determination of whether to reject the request can be based on a type of transition to the second program element.

In any of the foregoing aspects, to determine whether to activate the second program element, the operating system can be further operative to determine whether to reject the request based on a subsequent input event.

In any of the foregoing aspects, when the non-spatial input event is a mnemonic input event, to determine whether to request the second program element to process the mnemonic non-spatial input event, an input stack of the operating system can be operative to determine whether the non-spatial input event is a mnemonic event of a host program element of an application managed by the operating system, and can be operative to send a request to the host program element indicating the mnemonic non-spatial input event. The host program element can be operative to request the operating system to make the host program element the active program element.

In any of the foregoing aspects, when the non-spatial input event is an accelerator input event, to determine whether to request the second program element to process the accelerator non-spatial input event, an input stack of the operating system can be operative to identify other program elements containing the active first program element and to direct the accelerator non-spatial input event to one of the identified other program elements or the active first program element. To direct the accelerator non-spatial input event to one of the identified other program elements or the active first program element, a program element can be selected by traversing a hierarchy of the identified other program elements and the active first program element.

In any of the foregoing aspects, the first and second program elements can be separate applications, or separate processes of an application, or separate threads of a process, or separate user interface frameworks on a thread of a process. When the first and second program elements are separate applications, the operating system can be operative to manage state of the first and second program elements independently of each other as separate applications. In such a case, the first program element can be a host component, and the second program element can be a hosted component referenced by the host component.

The various aspects of such a computer system can be embodied in an article of manufacture includes at least one computer storage device, and computer program instructions stored on the at least one computer storage device. The computer program instructions, when processed by a processing system of a computer, the processing system comprising one or more processing units and memory accessible by threads executed by the processing system, and having a system timer, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer comprising:
   a processing system comprising a processing unit and a memory, the processing system executing an operating system and computer programs, the computer programs including a first program element and a second program element, the first program element having a first state managed by the operating system and indicative of whether the first program element is an active program element, the second program element having a second state managed by the operating system and indicative of whether the second program element is the active program element, and wherein the first program element and the second program element, when executed by the processing system under management of the operating system, are operative in cooperation with the operating system to:
   determine, by the first program element when the first program element is the active program element and in response to receiving a non-spatial input event, whether to request the second program element to process the non-spatial input event;
   send, by the first program element in response to a determination to request the second program element to process the non-spatial input event, a request to the second program element indicating the non-spatial input event;
   determine, by the second program element in response to the request from the first program element, whether to become the active program element;
   request, by the second program element in response to a determination to become the active program element, the operating system to make the second program element the active program element;

determine, by the operating system in response to the request from the second program element, whether to activate the second program element;

deactivate, by the operating system in response to a determination to activate the second program element, the first program element, and update stored information indicating the first state and the second state, and inform the first program element and the second program element that the first state and the second state have been updated; and process, by the second program element after becoming the active program element, the non-spatial input.

2. The computer of claim 1 wherein the operating system is operative to direct further non-spatial input events for processing to the second program element.

3. The computer of claim 1, wherein the first and second program elements are separate applications, and the operating system is operative to manage the states of the first and second program elements independently of each other as separate applications.

4. The computer of claim 3, wherein the first program element is a host component, and the second program element is a hosted component referenced by the host component.

5. The computer of claim 1, wherein the first and second program elements are separate processes of an application.

6. The computer of claim 1, wherein the first and second program elements are separate threads of a process.

7. The computer of claim 1, wherein the first and second program elements are separate user interface frameworks on a thread of a process.

8. The computer of claim 1, wherein the non-spatial input event is a directional navigation input event.

9. The computer of claim 8, wherein the directional navigation input event indicates a previous control or a next control from a current control.

10. The computer of claim 8, wherein the directional navigation input event indicates a previous group of controls or a next group of controls from a current group of controls.

11. The computer of claim 1, wherein the non-spatial input event is a mnemonic input event.

12. The computer of claim 1, wherein the non-spatial input event is an accelerator input event.

13. The computer of claim 1, to send the request to the second program element, the first program element is operative to call a method of the second program element.

14. The computer of claim 13, wherein, to send the request to the second program element, the first program element is operative to call the method of the second program element through a broker service of the operating system.

15. The computer of claim 1, wherein, to determine whether to request the second program element to process the non-spatial input event, the first program element is operative to determine whether to transfer focus of non-spatial input events to the second program element.

16. The computer of claim 15, wherein the request to the second program element is a request from the first program element to a parent program element indicating focus is leaving the first program element.

17. The computer to claim 15, wherein the request to the second program element is a request to a subcomponent of the first program element indicating that focus is being transferred to the subcomponent.

18. The computer of claim 15, wherein the second program element is operative, in response to the request from the first program element, to determine whether to transfer focus to a third program element.

19. The computer of claim 1, wherein, to determine whether to request the second program element to process the non-spatial input event, the first program element is operative to determine whether to transfer focus of non-spatial input events from a first control of a graphical user interface of the first program element to a second control of a graphical user interface of the second program element.

20. The computer of claim 19, wherein the second program element is operative to identify the second control to which focus is to be transferred, and to set focus to the second control.

* * * * *